Aug. 10, 1926.
A. GALLOW
MUZZLE
Filed April 22, 1926
1,595,546
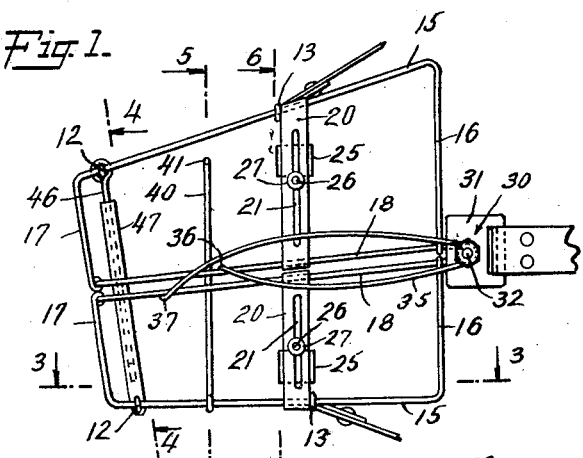
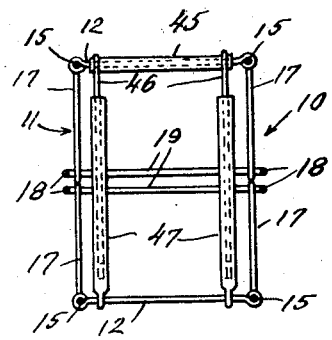
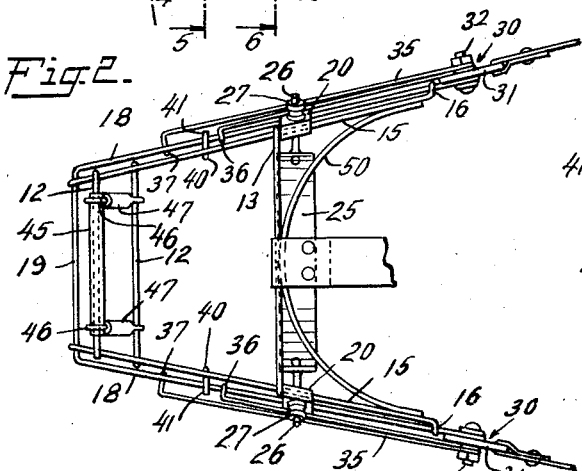
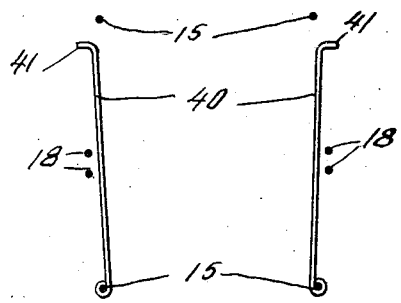
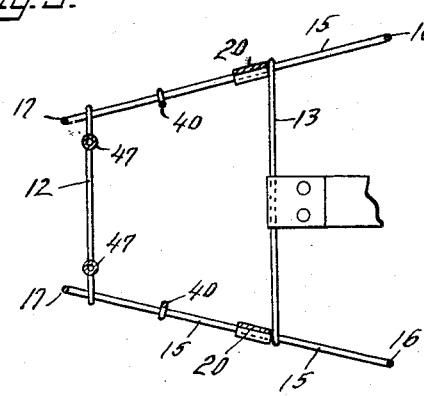
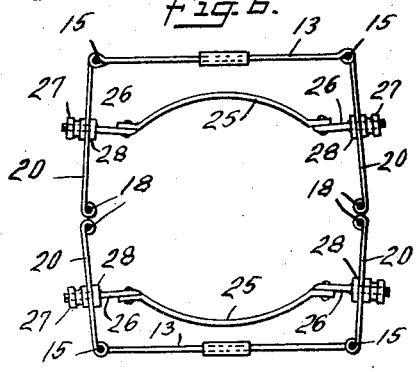
INVENTOR
Arthur Gallow
BY
Marshall & Hawley
ATTORNEYS Patented Aug. 10, 1926.

1,595,546

UNITED STATES PATENT OFFICE.

ARTHUR GALLOW, OF NEW YORK, N. Y.

MUZZLE.

Application filed April 22, 1926. Serial No. 103,730.

This invention relates to muzzles.

The main purpose of a muzzle is to prevent the animal wearing the muzzle from injuring or biting people. It is desirable, however, that the muzzle be so constructed as to give the animal as much comfort and freedom as possible without surrendering the restraining or protective features. For instance, the muzzle should permit the animal to open and close its mouth or to eat and drink without hindrance but, on the other hand, should prevent the animal from causing injury when the muzzle is open or closed.

The invention has for its salient object to provide a muzzle so constructed and arranged that an animal wearing the muzzle can open and close its mouth but cannot cause injury.

Another object of the invention is to provide a muzzle having parts engageable with the snout of the animal adjustable to fit different sizes of snouts.

Further objects of the invention will appear from the following specification taken in connection with the drawings, which form a part of this application, and in which—

Fig. 1 is an elevational view of a muzzle constructed in accordance with the invention;

Fig. 2 is a top plan view of the muzzle shown in Fig. 1;

Fig. 3 is a sectional elevation taken substantially on line 3—3 of Fig. 1; and

Figs. 4, 5 and 6 are sectional elevations taken substantially on lines 4—4, 5—5 and 6—6 of Fig. 1.

The invention briefly described consists of a muzzle comprising a pair of sections hingedly connected together and resiliently closed by means of springs. In order to adapt the muzzle to fit different sizes of snouts, a strap preferably of leather or fabric is adjustably secured to each section, the straps being adjustable toward or away from each other. Means is carried by one of the sections for engaging portions of the other section to limit the opening of the sections and barrier means is provided at the front of the muzzle for preventing the animal wearing the muzzle from causing injury when the muzzle sections are swung to open position. Further details of the invention will appear from the following description.

In the embodiment of the invention illustrated, the muzzle is formed of wire but it should be understood that the sections may be formed of metal stampings or any other desired material. Each section consists of what may be termed a cage formed of sides 10 and 11 connected along one edge by transverse connecting members 12 and 13. The sides 10 and 11 are formed of a wire having a longitudinal portion 15 and legs 16 and 17, the legs being connected by the sides 18 of a U-shaped frame which consists of the sides 18 and a cross-connecting bar 19. The portions 15 and the sides 18 of the U-shaped frame are also connected by bars 20 having slots 21 formed therein. Each section has a transverse strap 25 adjustably secured thereto, the ends of the strap having secured thereto threaded studs 26 which extend through the slots 21 and have mounted thereon thumb screws 27. Nuts or abutments 28 are mounted on the studs 26 and abut against the inner surfaces of the bars 20. This structure is clearly illustrated in Fig. 6 and it will be seen that the cross straps 25 can be easily and readily adjusted toward and away from each other to fit different sizes of snouts.

The sections are hingedly connected together at 30, one of the side members 18 having a lug 31 secured thereto and the other member having an eye mounted on a bolt 32 extending through the lug 31. A spring 35 encircles each of the bolts 32 and has one end as shown at 36 engaging one of the sections and the other end as shown at 37 engaging the other section, the spring being so mounted that it will normally retain the sections in closed position as shown in Fig. 1.

In order to limit the opening or swinging movement of the sections about the pivots 30, one of the sections has secured thereto a pair of stop bars 40 having offset ends 41 adapted to engage the sides 18 of the other section when the sections are opened or swung to open position about their pivots.

In order to prevent the animal wearing the muzzle from causing injury when the muzzle is open, one of the transverse connecting members 12 has mounted thereon a sleeve 45 to which are secured rods 46 and the other member 13 has pivoted thereon a pair of tubes 47 in which the rods 46 telescope. These telescoping members, therefore, form barrier rods for preventing injury when the muzzle is open.

The upper section has a brace or reinforcing member 50 secured thereto as shown in Fig. 3 and the straps for securing the muzzle to the animal are connected to the reinforcing member and cross bar 13 and to the lugs 31.

By adjusting the straps 25 so that they will engage the upper and lower jaw of the animal wearing the muzzle, it will be evident that the animal can easily open its mouth to eat or drink, but will be prevented from causing injury or damage by the barriers formed by the members 46, 47. The members 40, moreover, form stops for limiting the opening of the muzzle.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:—

1. A muzzle comprising a pair of sections hingedly connected together, straps adjustably carried by said sections and adapted to engage the snout of the animal wearing the muzzle and means for securing said straps in adjusted position.

2. A muzzle comprising a pair of sections hingedly connected together, a strap carried by each section extending transversely across the section and adapted to engage the snout of the animal wearing the muzzle, each strap being adjustably secured at its ends to the muzzle section.

3. A muzzle comprising a pair of sections hingedly connected together and telescoping barrier rods secured to said sections at the front ends thereof and between the sides of the sections.

4. A muzzle comprising a pair of sections hingedly connected together and telescoping barrier rods secured to said sections at the front ends thereof and between the sides of the sections, said rods being pivoted on at least one section.

5. A muzzle comprising a pair of sections hingedly connected together, straps adjustably carried by said sections and adapted to engage the snout of the animal wearing the muzzle, means for securing said straps in adjusted position, and telescoping barrier rods secured to said sections at the front ends thereof and between the sides of the sections.

6. A muzzle comprising a pair of sections hingedly connected together, resilient means for closing said sections, means for limiting the opening of said sections and an adjustable strap carried by each section and extending transversely thereof.

7. A muzzle comprising a pair of sections hingedly connected together, resilient means for closing said sections, means for limiting the opening of said sections, an adjustable strap carried by each section and extending transversely thereof, and telescoping barrier rods secured to said sections at the front ends thereof and between the sides of the sections.

8. A muzzle comprising a pair of sections hingedly connected together, resilient means for closing said sections, means on one section engageable with the other section for limiting the opening of said sections and an adjustable strap carried by each section and extending transversely thereof.

9. A muzzle comprising a pair of sections hingedly connected together, each section consisting of a frame having two sides and a connecting portion and having a cross section substantially U-shaped, and a strap adjustably secured at its ends to the sides of each section and extending transversely across the section, said straps being adjustable toward and away from each other.

10. A muzzle comprising a pair of sections hingedly connected together, each section having a slotted bar secured to the side thereof, and a strap having its ends adjustably mounted in the bars of each section and extending transversely across the section.

In witness whereof, I have hereunto set my hand this 20 day of April, 1926.

ARTHUR GALLOW.